Dec. 23, 1958 J. G. MACDONALD 2,865,349
LUBRICATING AND SYNCHRONIZING MEANS
FOR FREE PISTON ENGINES
Filed June 7, 1957 2 Sheets-Sheet 1

INVENTOR
JOHN G. MACDONALD
BY Douglas S. Johnson
ATTY.

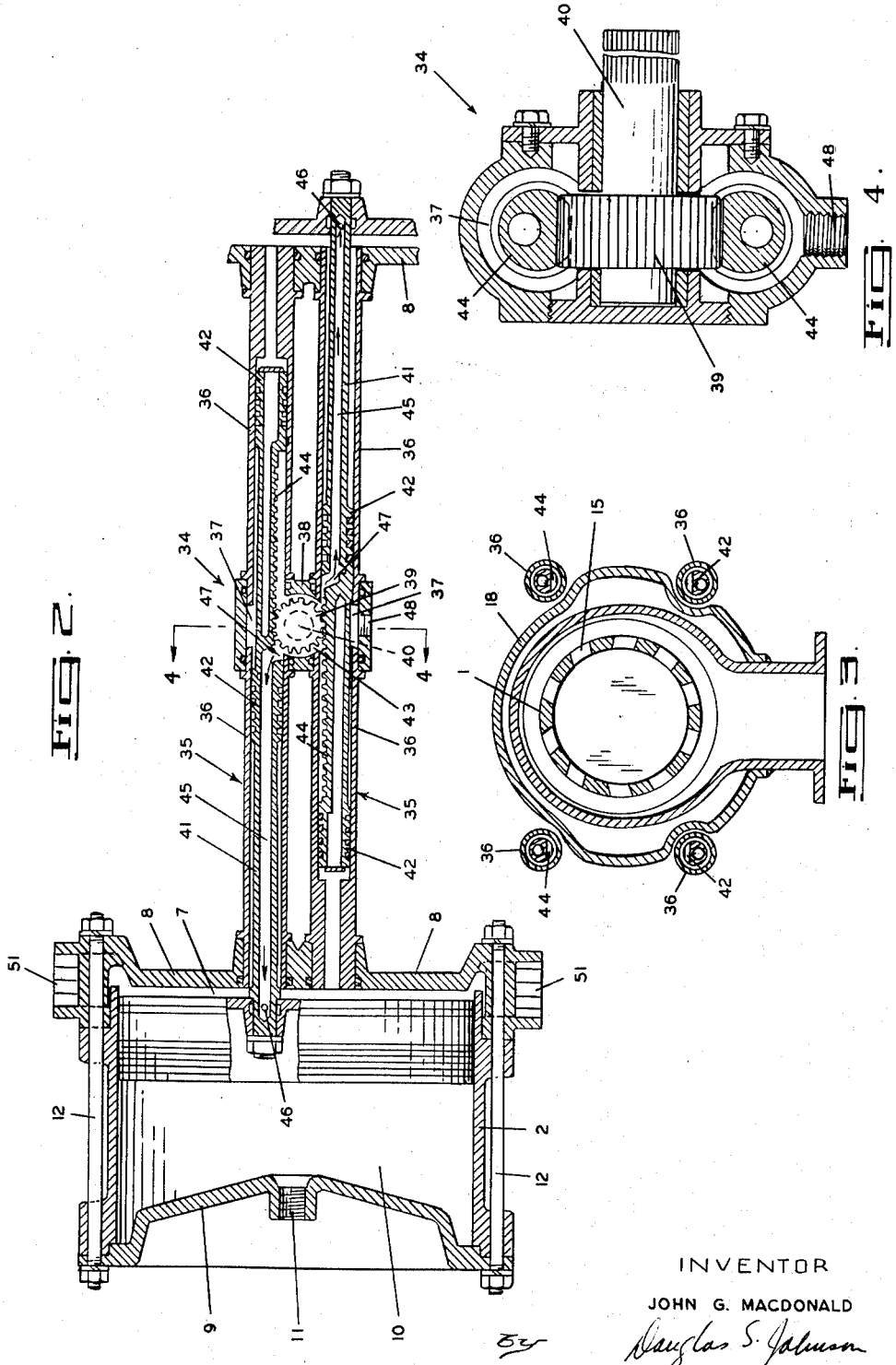

United States Patent Office 2,865,349
Patented Dec. 23, 1958

2,865,349

LUBRICATING AND SYNCHRONIZING MEANS FOR FREE PISTON ENGINES

John G. Macdonald, Goderich, Ontario, Canada

Application June 7, 1957, Serial No. 664,360

17 Claims. (Cl. 123—41.37)

This invention relates to improvements in free piston engines and more particularly to improvements in the construction and lubrication of such engines.

One of the important objects of the invention is to provide effective lubrication and cooling for the operating parts of the engine. In this connection, it is a particular object to provide for the lubrication of the synchronism mechanism in a manner which will eliminate pumping and cavitation and consequent heating of the lubricating fluid.

Another important object is to provide an improved piston construction having provision for effective cooling as aforesaid.

Still another important object is to provide improved synchronizing mechanism having provision for effective lubrication.

In this latter connection, it is an important object to provide protection against the entry of dirt into the synchronizing mechanism.

A further important object is to utilize the synchronizing mechanism as a means of increasing the volumetric efficiency of the engine compressors.

Again it is an object to provide a free-piston engine construction which will be of relatively simple, economical and durable construction which lends itself to ready replacement or repair. In this aspect of the invention it is a particular object to eliminate distortion or binding of the component mechanisms under thermal changes.

The principal feature of the invention resides in providing an arrangement of passages in the piston to deliver cooling oil or fluid under the crown of the piston, and providing passage systems for delivering the liquid to and exhausting it from the piston, which systems maintain a constant volume under piston reciprocation, thereby eliminating pumping of the liquid.

More particularly according to the invention, the delivery and exhaust systems include the synchronizing mechanism whereby lubricating of the synchronizing mechanism is achieved.

Another important feature resides in the construction of the synchronizing mechanism which comprises a pair of rack members, one carried by each oppositely reciprocating piston, which engage a common pinion, the rack members having passages therethrough which have a constant volume while continually remaining in fluid flow connection with the engine exterior.

More particularly, the rack members operate within tubes or cylinders connected between and in communication with the interiors of the compressor chambers in which the compression pistons operate, and the ends of the rack members are formed as pistons sealing flow of lubricant to the compressor chambers and additionally assisting in the compression of the air in the compression chambers to provide increased compressor efficiency.

The pinion engaged by the racks operates in a protective housing through which the pinion shaft extends and inasmuch as the racks operate in tubes which are only in communication with, in addition to the housing, the compressor cylinders to which filtered air is delivered, the synchronizing mechanism is protected against dirt and foreign particles.

In connection with the rack enclosing tubes or cylinders, another feature resides in journalling these tubes in the heads of the compressor cylinders to accommodate any expansion of the diesel cylinder disposed between the compressor cylinders.

Another important feature resides in forming each of the opposing pistons of separate portions comprising a diesel portion operating in the diesel or firing cylinder and a compressor portion operating in the compressor cylinder and tying the diesel and compressor portions together by means of a hollow tie rod comprising the passage means for delivering the cooling liquid or lubricant to the diesel portion of the piston.

With this arrangement, the diesel portion of the piston can be formed of cast iron or steel to resist heat while the compressor portion can be formed, for instance, of aluminum.

These and other objects and features of the invention will become apparent from the following description when taken in conjunction with the accompanying drawings, in which:

Figure 2 is a longitudinal vertical section partly broken away, taken through one of the synchronizing mechanisms;

Figure 3 is a transverse vertical section taken on the line 3—3 of Figure 1;

Figure 4 is a transverse vertical section taken on the line 4—4 of Figure 2.

Figure 1:
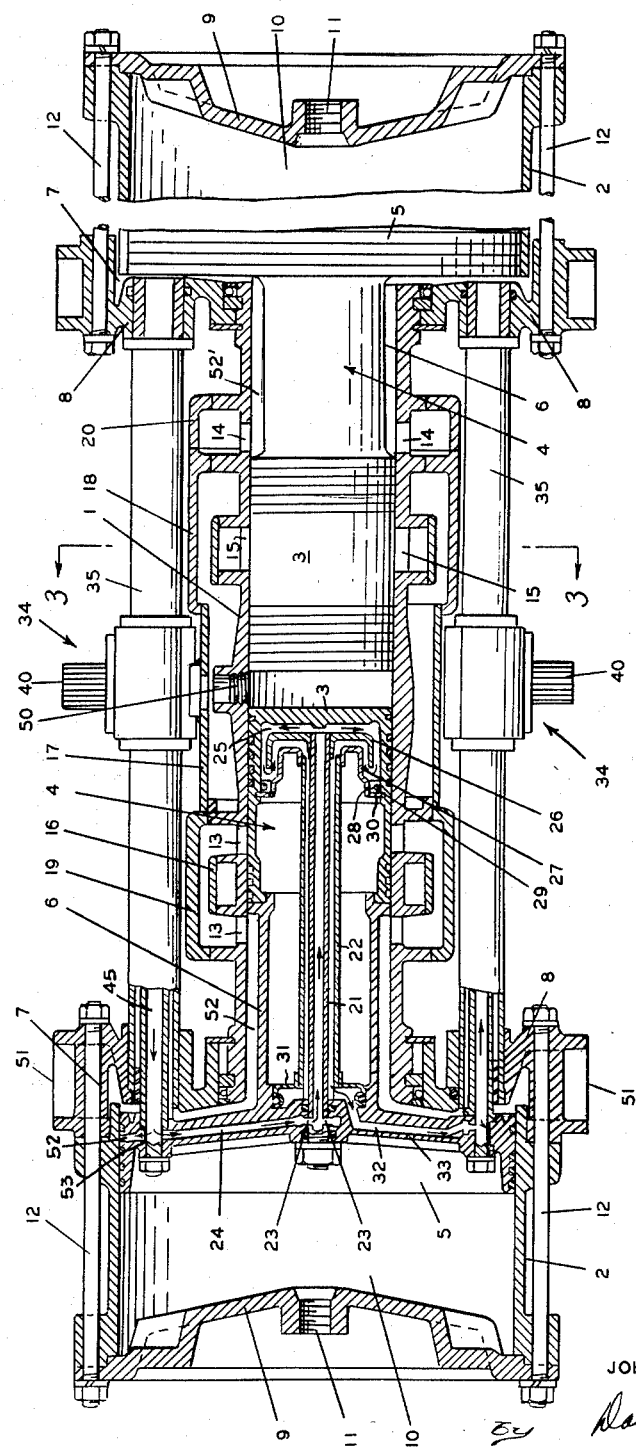
Figure 1 is a longitudinal horizontal sectional view, partly broken away, of a free piston engine unit constructed to embody the invention, and shown partly in diagrammatic form.

With reference to Figure 1, the free piston engine unit illustrated comprises a central power or diesel cylinder 1 having at each end thereof an enlarged compressor cylinder 2. Disposed to operate within the diesel cylinder 1 are the diesel portions 3 of a pair of oppositely disposed pistons 4. Each of the pistons 4 has an enlarged compressor piston portion 5 operating in one of the compressor cylinders 2.

The diesel and compressor portions of the pistons 4 are connected by a reduced neck portion 6 which provides communication between the compressor chambers 7 defined between the inner heads 8 of the compressor cylinders 2 and the compressor piston portions 5 and the interior of the diesel cylinder 1 behind the diesel piston portions 3. Defined between the outer ends of the compressor portions 5 of the pistons and the outer heads 9 of the compressor cylinders are bounce chambers 10 into which air may be introduced or removed through passages 11. The cylinder heads 8 and 9 are held assembled with the barrels of the compressor cylinders 2 by means of suitable tie rods 12.

The diesel cylinder 1 is shown of a fabricated welded design wherein the cylinder barrel is turned from seamless steel tubing and has cut therethrough at the left hand end spaced transfer ports 13 and at the right hand end transfer ports 14 and exhaust ports 15. Suitable rings 16, 17 and 18, welded to the cylinder 1, define water jackets around the diesel cylinder while suitable rings 19 and 20, welded to the cylinder, define collecting and distributing passages for collecting and distributing the airflow through the transfer ports 13 and 14. These latter rings may communicate with a suitable air storage box or where the free piston unit is one of a pair, or siamesed units, these rings may be connected for cross scavenging as disclosed in my co-pending application serial No. 609,579, now abandoned.

As illustrated, each of the pistons 4 comprises an assembly of the separate diesel and compressor portions 3 and 5, and with this arrangement, the diesel portion 3 can be formed of cast iron or steel to resist the heat in the power cylinder while the compressor portion 5 is formed of aluminum or other suitable light material. The piston portions 3 and 5 are secured together by a hollow tie rod 21 disposed concentrically within a surrounding sleeve or tube 22.

It is one of the features of the present invention to provide for the cooling of the engine and in this connection, it will be seen that the tie rod 21 has an arrangement of ports 23 leading to the interior thereof which communicate with a passage 24 formed in the compressor piston portion 5 of each piston. At the opposite end, the tie rod 21 communicates with passageways 25 beneath the crown of the diesel piston portion 3 defined by baffle rings 26 and 27, end ring 28, sealing O ring 29, and the interior of the crown of the piston portion 3. The baffle ring assembly is located in position by a suitable snap ring 30.

In addition to communicating with the interior of the hollow tie rod 21, the passageways 25 in the diesel piston portion 3 of each piston communicate at their opposite ends with the interior of the sleeve 22, which, in turn, communicates through baffle ring 31 with a passageway 32 formed in the compressor portion 5 of the piston and closed by plate 33. Thus, flow of suitable lubricant and cooling medium, such as a suitable viscosity oil, can be effected beneath the crown of the diesel portion 3 of each of the pistons by forcing the coolant through the hollow tie rod 21 through the passages 25 back out the sleeve 22 and through the passageway 32. Of course, flow may be reversed if desired. At the appropriate points, suitable seal rings or O rings corresponding to the ring 29 are provided.

To provide proper engine operation, the movement of the opposing pistons 4 must be synchronized. The synchronizing mechanism, generally designated at 34, will be best understood with reference to Figure 2, which illustrates the synchronizing mechanism at one side of the free piston unit. In the unit illustrated, there is shown a pair of synchronizing mechanisms disposed one at the opposite side of the unit to the other, although as will hereinafter appear, synchronization of the piston movements can be achieved with a single synchronizing mechanism.

Each synchronizing mechanism 34, as illustrated, comprises a pair of tubular guideways 35 disposed in spaced relation and extending between the compressor cylinders 2. More specifically, each of the guideways 35 comprises a pair of tubes 36 journalled at one end in the inner head 8 of one of the compressor cylinders and opening to the interior of the compressor chamber 7 of such latter cylinder, and journalled at the opposite end in the tubular portions 37 of a housing 38 in which is mounted a pinion 39 on a shaft 40. Reciprocally arranged in each of the guideways 35 is a plunger 41 which extends through and is secured to the compressor portion 5 of one of the pistons 4. The plungers 41 of each pair of guideways 35 are oppositely disposed and connected to opposite pistons 4. The plungers 41 are formed with spaced piston formations 42 thereon so disposed that under piston and hence plunger reciprocation, they always remain on opposite sides of the pinion housing 38, or rather, the pinion chamber 43 with which the tubular portions 37 of the housing communicate.

Between the piston formations 42 the plungers 41 are formed with rack portions 44 which simultaneously engage the pinion 39 on opposite sides thereof, whereby through the common engagement with the pinion, the plunger and hence piston movements are synchronized. The plungers 41 are of hollow construction providing a passageway 45 in communication at the end connected to the compressor piston portion through suitable orifices 46 with one of the passages 24 or 32 and opening through to the exterior of the plunger through passage 47 to the interior of the respective tubular guideways 35 at a point between the spaced piston formations 42.

As will be seen in Figure 1, a bleed passage 52 formed through the wall of piston portion 5 communicates with passageway 45 of hollow plunger 41 as at 53, providing for lubrication of the surfaces of the piston portion 5 and compressor cylinder 2.

It will be appreciated from Figure 1 that the compressor portion 5 of each piston 4 carries a pair of plungers 41 with each plunger being one component of the synchronizing mechanism at the respective side of the free piston engine unit, and by providing suitable passages 48 in the housings 38 which may be connected respectively at one side with an external source of oil pressure, such as a pump, and at the other side, to a reservoir, oil may be pumped into the unit through one set of plungers at one side thereof, and delivered out of the unit through the other set of plungers at the opposite side thereof after having been conducted by means of the hollow tie rod 21 and sleeve 22 to beneath the crown of the diesel piston portions 3, and back to the compressor piston portions 5.

With the arrangement illustrated, despite the fact that the pistons and hence plungers are reciprocating at a high rate of speed, there will be no change in the volume of the oil or lubricant within the unit, but rather, there is merely a change in the point between the piston formations 42 of the plungers 41 where the oil is introduced into and removed from the unit. Thus, because there is no volumetric change in the oil under piston reciprocation, there is no pumping or cavitation of the oil leading to heating or other undesirable effects.

Moreover, by having the tubular guideways 35 extending between the compressor cylinders 2 and opening into the interior of the compressor cylinders, the movement of the plungers, which will be opposite to the movement of the opposing pistons, will produce a compression between the piston formations 42 at the outer ends thereof and the opposing pistons to increase the compression efficiency in the respective compression chambers. Moreover, the provision of the tubular guideways 35 protects the synchronizing mechanism from dirt and contamination, yet by virtue of the arrangement wherein the ends of the tubes 36 of the guideways are journalled in the respective cylinder and housing members, expansion of the power or diesel cylinder can be accommodated.

With the arrangement illustrated, an oscillating drive from the synchronizing mechanism is obtained at the shaft 40 at each side of the unit, and the drive obtained from these shafts 40 may be used for operating the injection fuel pump or other engine components as will be understood by those skilled in the art. It will be understood, of course, that the pinion and shaft 39 and 40 may be omitted from one side of the unit, so that synchronization is achieved from the employment of one synchronizing mechanism only, yet oil feed free of pumping will still be achieved through the maintenance of constant oil passage volume within the unit under piston reciprocation.

The operation of the engine will be understood by those skilled in the art. Very briefly, the engine may, for instance, be started by introducing air under pressure into the bounce chambers 10 to force the pistons 4 towards each other to compress air in the firing chamber 49 defined between the diesel portions 3 of the piston. When fuel is injected by a suitable fuel injector, not shown, through the fuel injection opening 50, it will be ignited, driving the pistons outwardly with synchronized movement under the synchronizing action of the synchronizing mechanism 34.

As the compressor portions 5 of the pistons move outwardly, air is drawn in through suitable valves 51 which are not detailed, but may, for instance, be of the reed type. The outward movement of the pistons effects the compression of the air in the bounce chambers 10. At the same time, the right hand piston uncovers the exhaust ports 15 allowing the products of combustion to escape to drive the turbine, not shown, to be operated by the engine.

While the products of combustion are exhausting through the exhaust ports 15, the left hand piston 4 will have uncovered the inner transfer ports 14, placing the combustion area of the diesel cylinder 1 in communication with the previously compressed scavenging air which moves in to scavenge the diesel cylinder and complete the exhaust. As the compressor portions 5 of the piston reach the outer end of their stroke, the energy in the compressed air in the bounce chambers 10 will then drive the piston inwardly. Thus, the air which has entered the compressor chambers 7 through the valves 51 will be compressed and as soon as the pistons have moved far enough inwardly so that the reduced neck portion 6 provides communication through the passages 52 and 52' to the transfer ports 13 and 14 respectively, this compressed air will be delivered through the distributor rings 19 and 20, either to the air storage box or to an alternately firing unit for cross scavenging, as previously mentioned.

The various piston portions described will preferably be provided with suitable piston rings 53, and suitable sealing or O rings will be provided as required, as will be understood by those skilled in the art.

By virtue of forming the pistons 4 as separate diesel and compressor portions 3 and 5 respectively, a practical light weight piston can be formed enabling the use of material such as aluminum for the compressor component, and the pistons can be carefully balanced since both are of identical construction. Also, the hollow tie rod 21 used to conduct the lubricant and coolant to the diesel portion of the piston is fully adequate to maintain the diesel and compressor piston components in assembled relation since the forces acting on the piston components are always in a direction to maintain them in assembled relation.

It will also be understood that various modifications in details and arrangements may be made within the spirit of the invention and scope of the appended claims.

What I claim as my invention is:

1. In a free piston engine, a diesel cylinder, a compressor cylinder at each end of said diesel cylinder, a pair of opposing pistons each having a diesel piston portion disposed to operate in said diesel cylinder and a compressor piston portion disposed to operate in said compressor cylinder, and synchronizing means for synchronizing the movement of said pistons, said synchronizing means comprising a pair of oppositely disposed rack members, one connected to each of said pistons, said rack members engaging a common pinion, each of said pistons having lubricating passage means therein and lubricating passage means including said rack members having a constant volume for all piston positions in communication with said piston passage means and the exterior of said engine.

2. In a free piston engine, a diesel cylinder, a compressor cylinder at each end of said diesel cylinder, a pair of opposing pistons each having a diesel piston portion disposed to operate in said diesel cylinder and a compressor piston portion disposed to operate in said compressor cylinder, each of said pistons having lubricating passage means therein, a synchronizing mechanism for synchronizing the movement of said pistons comprising a pair of tubes extending between and in communication with the interiors of said compressor cylinders, a rack member connected to each of said compressor piston portions and disposed for reciprocal movement in consequence of piston reciprocation in one of said tubes, a pinion disposed between and exposed through the walls of said tubes to the interiors thereof and in common engagement with said rack members, a housing for said pinion, said tubes and rack members being formed to provide lubricating passage means leading from said piston passage means to said pinion housing and having a volume constant for all pinion and hence rack positions, and said pinion housing having passage means communicating with the exterior of said housing.

3. A device as claimed in claim 2 in which the ends of said rack members remote from their respective compressor piston portions are formed as pistons.

4. A device as claimed in claim 2 in which said tubes are journalled in said compressor cylinders to accommodate diesel cylinder expansion.

5. A device as claimed in claim 2 in which the diesel and compressor piston portions of each of said pistons are separate components, and the lubricating passage means therein comprises a hollow tie rod connecting said piston portions.

6. A device as claimed in claim 5 in which said hollow tie rod is concentrically disposed within a tube extending between said piston portions, said tie rod forming a flow passage for lubricant flow in one direction and said surrounding tube forming a concentric passage for lubricant flow in the opposite direction.

7. In a free piston engine, a diesel cylinder, a compressor cylinder at each end of said diesel cylinder, a pair of opposing pistons each having a diesel portion disposed to operate in said diesel cylinder and a compressor piston portion disposed to operate in one of said compressor cylinders, each of said pistons having lubricating passage means therein for conducting lubricant to and from the diesel portion, at least one pair of tubular guideways extending between and in communication with said compressor cylinders, a plunger member disposed in each of said guideways, one of said plunger members being connected to the compressor portion of one of said pistons, the other of said plunger members being connected to the compressor portion of the other of said pistons, each of said plungers at portions removed from its point of connection with its respective piston portion presenting a pair of piston formations snugly fitting the respective tubular guideway and a rack portion disposed between said piston formations, each of said plungers further being formed with a passageway therethrough leading from its end connected to the compressor piston portion and in communication with its respective piston lubricating passage means and opening to its tubular guideway between its said piston formations to provide for lubrication of its said rack portion, said tubular guideways opening intermediate of their length to a housing to expose the rack portions of said plungers to the interior of said housing at opposing points, a pinion mounted in said housing between and in common engagement with said rack portions, an output shaft disposed to be driven by said pinion, and lubricating passage means providing communication between the interior and exterior of said housing.

8. A device as claimed in claim 7 in which said tubular guideways are journalled in and extend through an end wall of each of said compressor cylinders.

9. A device as claimed in claim 7 in which each of said tubular guideways comprises a pair of tubes each journalled at one end in a wall of one of said compressor cylinders and at the other end in a tubular portion of said housing.

10. A device as claimed in claim 7 in which the diesel portion and compressor portion of each of said pistons are coupled together by a hollow tie rod concentrically disposed within a surrounding sleeve, said tie rod and sleeve comprising said lubricating passage means for lubricant flow between said piston portions.

11. A device as claimed in claim 10 in which the compressor portion of each of said pistons has separate passage means therein comprising an inlet passage communicating with one of the passages defined by said hollow tie rod and sleeve and an outlet passage communicating with the other of said passages defined by hollow tie rod and sleeve, one of said inlet and outlet passages communicating with one of said plunger passageways and the other of said inlet and outlet passages communicating with the passageway of a plunger corresponding to the aforesaid plunger connected at the opposite side of said latter compressor piston portion.

12. In a free piston engine, a diesel cylinder connected between a pair of enlarged compressor cylinders, a pair of oppositely disposed pistons having a reduced diesel portion disposed to operate in said diesel cylinder and an enlarged compressor portion disposed to operate in one of said compressor cylinders, two pairs of tubular guideways disposed one at opposite sides of said diesel cylinder to the other, each guideway extending between and opening to the interior of said compressor cylinders, each pair of guideways opening intermediate of their length to a common housing, a pair of plunger members secured to the compressor portion of each of said pistons at opposite sides thereof and extending through the wall of the respective compressor cylinder and each reciprocally received in one of the tubular guideways of the pair of guideways at the respective side of the diesel cylinder, said plunger members having spaced piston formations snugly fitting their respective tubular guideways, said piston formations being so disposed that throughout all piston and plunger movement they lie on opposite sides of the point at which said guideways open to their respective housing, each of said plungers having lubricating passage means therein leading from their point of attachment to the respective compressor piston portion and opening through the plunger wall to the interior of the respective guideway at a point between the said spaced piston formations, each of said pistons having lubricating passage means therein comprising an inlet passage in communication with the lubricating passage means in one of said plungers secured thereto and an outlet passage in communication with the lubricating passage means in the other of said plungers secured thereto, one of said guideway pair housings having an inlet passage thereto and the other of said guideway housings having an outlet passage leading therefrom, at least one corresponding pair of plungers secured to said oppositely disposed pistons having rack portions formed thereon between the respective spaced piston formations, said rack portions being exposed to the interior of the respective common housing in oppositely disposed relation, and a pinion mounted in said latter housing and in common mesh with said rack portions, and an output shaft arranged to be driven by said pinion on plunger reciprocation.

13. A device as claimed in claim 12 in which the diesel and the compressor portions of each of said pistons are assembled together by means of a hollow tie rod disposed within a surrounding sleeve, and said piston lubricating passage means comprises said hollow tie rod and sleeve, and in addition, passages in said diesel portion in communication at opposite ends with said hollow tie rod and sleeve respectively and separate passages in said compressor piston portion, one in communication with one of said plunger passages and said hollow tie rod and another in communication with the other of said plunger passages and said sleeve.

14. A device as claimed in claim 13 in which at least one of said passages in said compressor piston portion opens to the wall of the respective compressor cylinder.

15. A piston for a free piston engine comprising a reduced diesel piston portion and an enlarged compressor piston portion, a hollow tie rod connecting said piston portions together, a sleeve surrounding said hollow tie rod, passage means for a lubricating and cooling media formed in said diesel piston portion and at opposite ends in communication with the interior of said hollow tie rod and said surrounding sleeve respectively, separate inlet and outlet passages formed in the compressor portion of said piston, one of said inlet and outlet passages being in communication with the interior of said hollow tie rod and the other of said inlet and outlet passages being in communication with the interior of said sleeve.

16. A piston as claimed in claim 15 in which one of said inlet and outlet passages opens to the periphery of said compressor cylinder portion.

17. A piston as claimed in claim 15 in which the compressor portion of said piston has secured thereto a pair of hollow plungers, the interior of one of said plungers being in communication with one of said inlet and outlet passages, and the other of said plungers being in communication with the other of said inlet and outlet passages.

References Cited in the file of this patent

UNITED STATES PATENTS

| | | |
|---|---|---|
| 1,304,615 | Smith | May 27, 1919 |
| 1,747,948 | Pescara | Feb. 18, 1930 |

FOREIGN PATENTS

| | | |
|---|---|---|
| 605,191 | Great Britain | July 19, 1948 |